United States Patent
Baran et al.

[19]

[11] Patent Number: 5,904,592
[45] Date of Patent: May 18, 1999

[54] DUAL MODE DIN RAIL LATCH WITH TACTILE FEEDBACK

[75] Inventors: Michael S. Baran, Elm Grove; Gregory E. Jankowski, Mukwonago, both of Wis.

[73] Assignee: Allen-Bradley Company, LLC, Milwaukee, Wis.

[21] Appl. No.: 09/163,597

[22] Filed: Sep. 29, 1998

[51] Int. Cl.[6] .................................................. H01R 13/60
[52] U.S. Cl. ............................................ 439/532; 361/627
[58] Field of Search ................................... 439/532, 527, 439/121, 94, 110, 282; 361/627

[56] References Cited

U.S. PATENT DOCUMENTS

| | | |
|---|---|---|
| 4,921,445 | 5/1990 | Herbert . |
| 5,192,227 | 3/1993 | Bales . |
| 5,602,363 | 2/1997 | Von Arx . |
| 5,704,805 | 1/1998 | Douty et al. . |

FOREIGN PATENT DOCUMENTS 1-75815  3/1989  Japan .

*Primary Examiner*—Steven L. Stephan
*Assistant Examiner*—Michael C. Zarroli
*Attorney, Agent, or Firm*—John M. Miller; John J. Horn; William R. Walbrun

[57] ABSTRACT

The present invention provides a dual mode DIN rail latch for an electrical component chassis that provides a tactile feedback warning to the user of the impending snap point placing the latch in the open position. In one embodiment of the present invention, the latch has a locking tab mounted to the chassis for slidable movement. The locking tab has a pair of springs that extend into an opening formed in the locking tab and engage a nub formed as an integral part of the chassis. The springs impinge upon sidewalls of the opening as the locking tab approaches an impending mode change. The impinging action provides tactile feedback to the user of the impending change in mode.

12 Claims, 3 Drawing Sheets

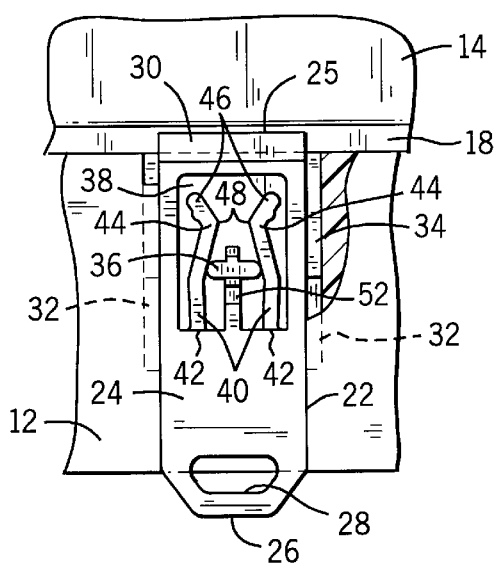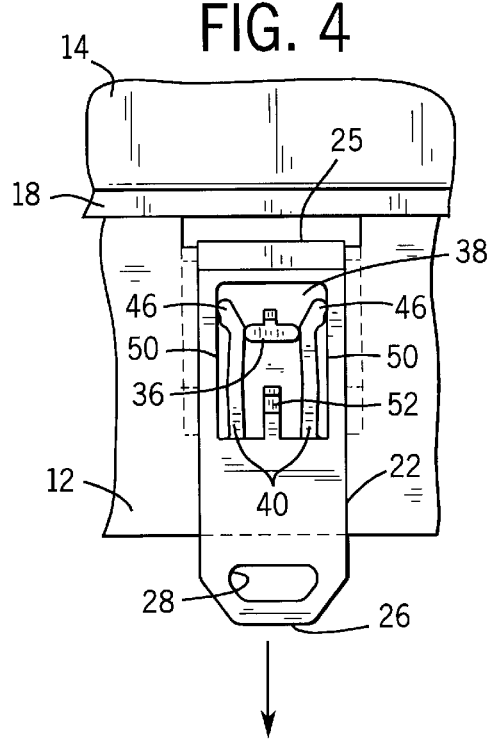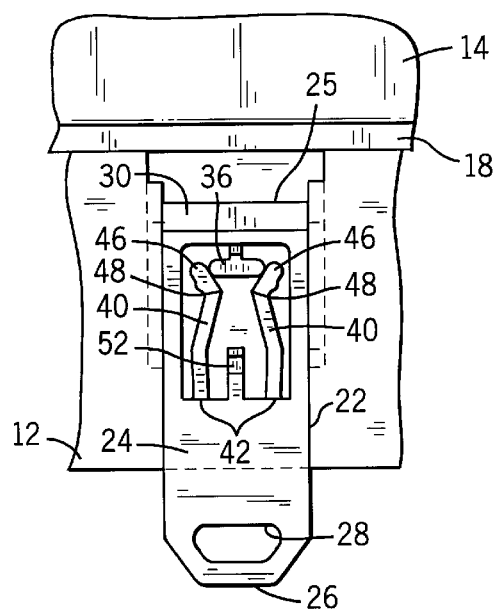

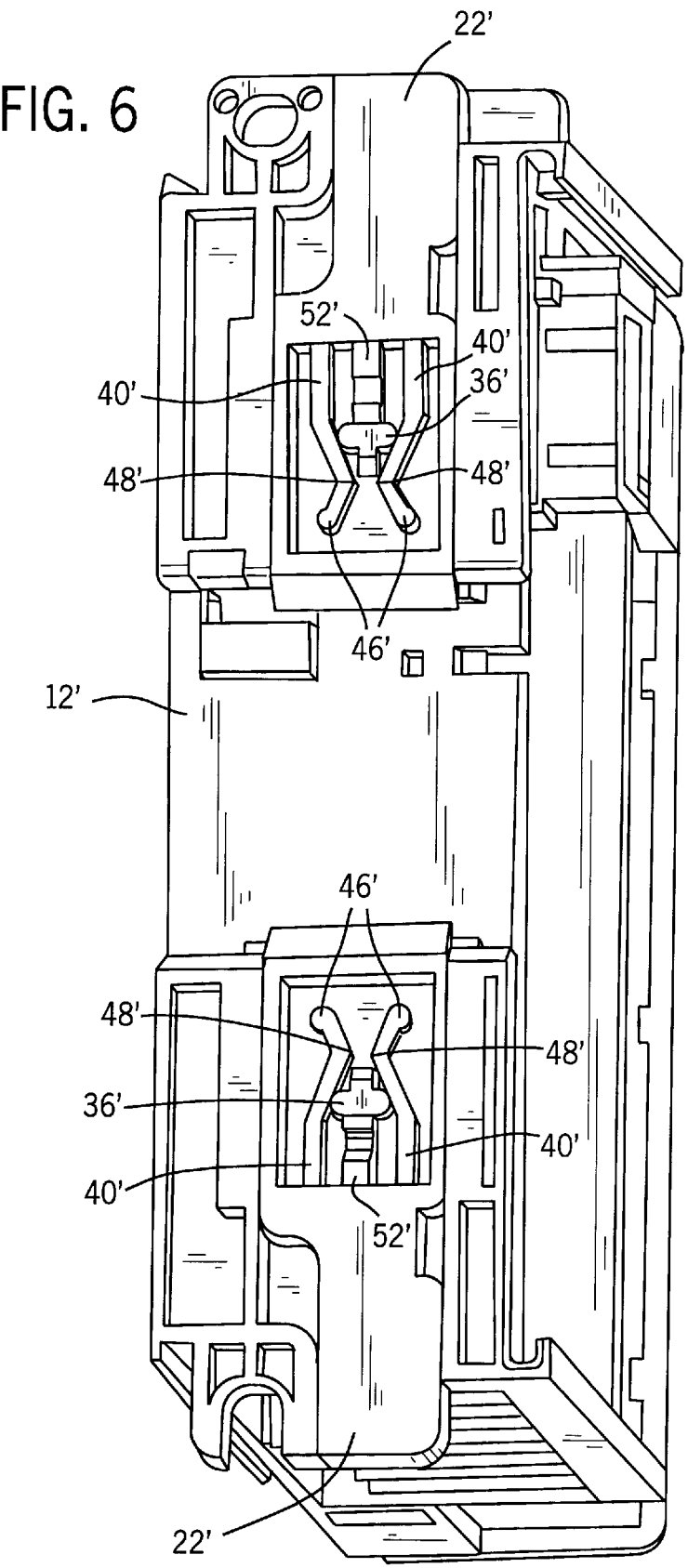

DUAL MODE DIN RAIL LATCH WITH TACTILE FEEDBACK

CROSS REFERENCES TO RELATED APPLICATIONS

Not Applicable

STATEMENT REGARDING FEDERALLY SPONSORED RESEARCH

Not Applicable

BACKGROUND OF THE INVENTION

The field of invention is DIN rail latches for mounting components on a DIN rail, more particularly a dual mode DIN rail latch having tactile feedback.

A DIN rail being characterized by an elongate channel having opposed coplanar flanges along its length is used in the art for mounting electrical components in electrical panels. The rail is mounted in a panel using screws and the like. Components incorporating one or more DIN rail mounting latches are then detachably mounted to the rail.

Various latches have been developed for detachably mounting components to a DIN rail. A typical latch assembly has a lip integrally formed part of an electronic component chassis that engages an upper or lower flange of a DIN rail and a spring biased locking tab mounted to the chassis for slidable movement engages the opposing flange of the DIN rail. To mount the chassis on the DIN rail, the user hooks the lip over the upper DIN rail flange and then snaps the chassis in place by applying pressure to the chassis forcing it toward the DIN rail. To detach the chassis from the DIN rail, the user pries the locking tab downward disengaging the tab from the DIN rail lower flange allowing the chassis to swing away from the rail and disengage the lip from the upper flange.

Single mode latches have a locking tab that is continuously urged toward the DIN rail by springs. Large components, such as an Allen-Bradley MicroLogix™ 1000 programmable controller, available from Rockwell Automation/Allen-Bradley, Milwaukee, Wis., have two or more latches for mounting the controller to the DIN rail. In order to detach the MicroLogix™ 1000 controller from the DIN rail all the locking tabs must be pried downwardly. If the latches are the single mode type, all the tabs must be pulled away from the DIN rail and held in that position while swinging the controller away from the DIN rail. This is a difficult task for a user with only two hands. The task becomes even more difficult when multiple components are interlocked together, such as in a "tongue and groove" configuration, forming a long module assembly having multiple rail latches.

Dual mode latches have been developed to overcome this problem. These dual mode latches, such as described in Japanese Patent Application 1-75815, filed on Mar. 28, 1989 and laid open on Oct. 15, 1990 have a first mode (closed position), for mounting to the DIN rail, and a second mode (open position), for detaching from the DIN rail. In the first mode, the latch continuously urges the locking tab toward the DIN rail as in the single mode type. In the second mode, the locking tab is held away from the DIN rail using means, such as described in Japanese Patent Application 1-75815, thus freeing the user's hands to swing the mounted component away from the DIN rail.

In certain situations, a user may desire to pull the tab downwardly without switching from the first mode to the second mode. The present dual mode latches do not provide any indication of an impending mode change.

BRIEF SUMMARY OF THE INVENTION

The present invention provides a dual mode DIN rail latch for an electrical component chassis that provides tactile feedback warning the user of the impending snap point placing the latch in the open position. The latch has a locking tab mounted to the chassis for slidable movement. The locking tab has a pair of springs that extend into an opening formed in the locking tab and engage a nub formed as an integral part of the chassis. The springs impinge upon sidewalls of the opening as the locking tab approaches an impending mode change. The impinging action accomplishes the general objective of providing tactile feedback to the user of the impending change in mode.

Another aspect of the present invention provides a method of providing tactile feedback of an impending mode change in a dual mode DIN rail assembly. The method includes sliding a locking tab having an opening past a nub extending through the opening; flexing springs outwardly as the locking tab passes the nub; impinging outwardly extending extensions of at least one of the springs against a sidewall of the opening; and retracting the springs inwardly after the locking tab changes mode.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 3 is a plan view of a locking tab in a first mode (closed position) of a latch of FIG. 1;

FIG. 4 is a plan view of a locking tab of FIG. 1 transitioning between a first and second modes.

FIG. 5 is a plan view of a locking tab in a second mode (open position) of a latch of FIG. 1; and FIG. 6 is perspective view of a second embodiment of the present invention having opposing locking tabs.

DETAILED DESCRIPTION OF THE PREFERRED EMBODIMENTS

As shown in FIGS. 1–5, an embodiment of the present invention is a dual mode DIN rail latch 10 having tactile feedback for detachably mounting an electrical component chassis 12 to a DIN rail 14. Looking particularly at FIG. 1, the DIN rail 14 is a metal channel having two opposed outwardly extending flanges 16, 18 for engaging the latch 10. Preferably, the rail 14 is horizontally mounted to an electrical panel (not shown) providing upper and lower DIN rail flanges 16, 18. The present invention provides tactile feedback to a user prior to the dual mode DIN rail latch 10 mode change from one mode, such as a closed position shown in FIG. 3, to a second mode, such as an open position shown in FIG. 5.

Figure 1:
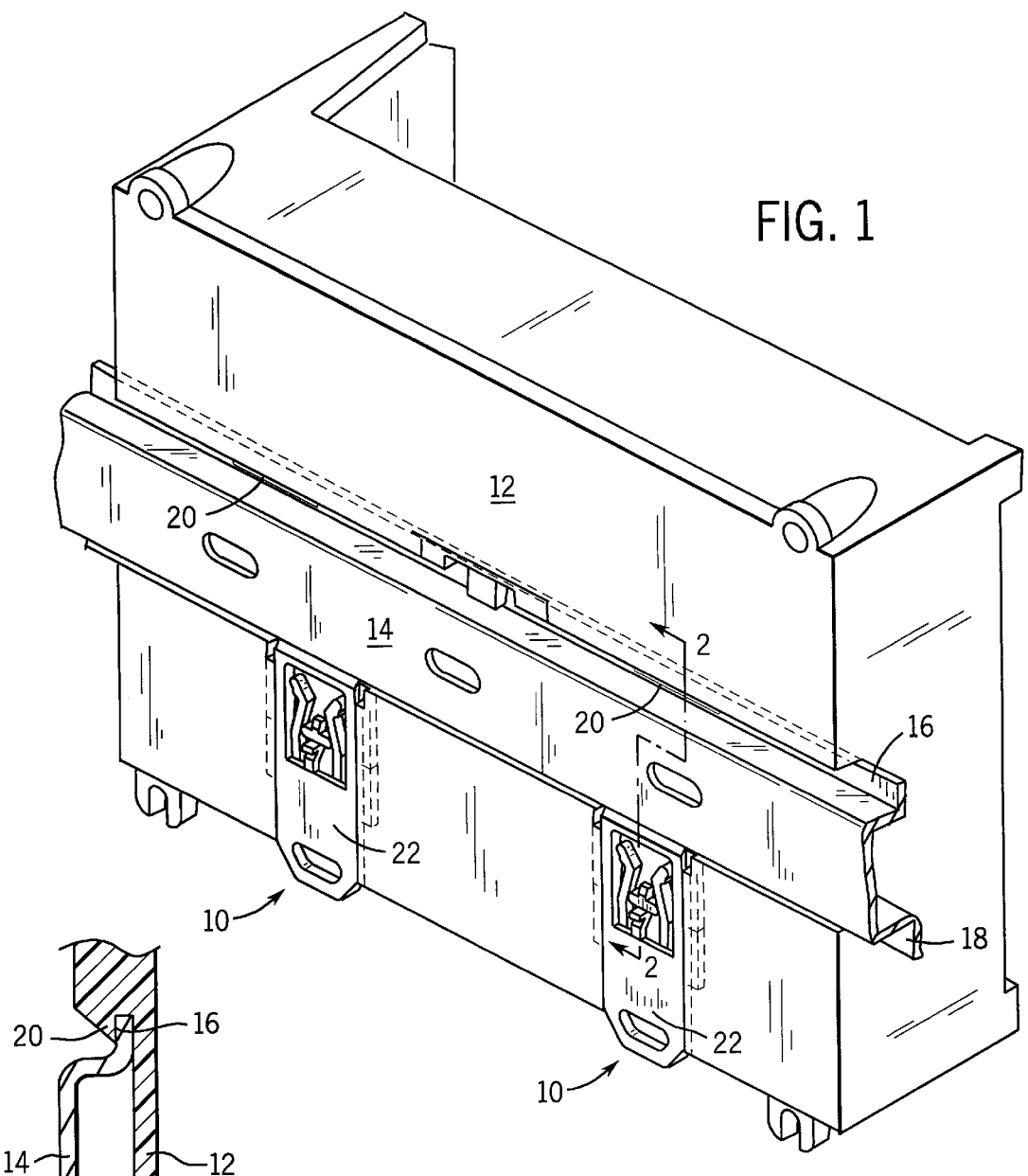
FIG. 1 is a perspective view of a chassis mounted to a DIN rail using dual mode DIN rail latches incorporating the present invention.
Figure 2:
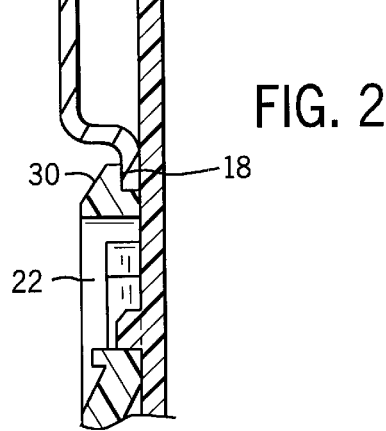
FIG. 2 is a cross sectional view along line 2—2 of a dual mode DIN rail latch of FIG. 1.

As shown in FIG. 2, the chassis 12 has a downwardly depending lip 20 formed as an integral part of the chassis 12 which engages the rail upper flange 16, and a locking tab 22 mounted to the chassis 12 for slidable movement engages the DIN rail lower flange 18 retaining the chassis 12 on the rail 14. Although a lip 20 is described herein, a locking tab 22 as described herein may be used to engage the rail upper flange 16 without departing from the scope of the present invention. Of course, a locking tab for engaging the upper DIN rail flange 16 would be appropriately mounted for slidable movement to disengage the DIN rail 14.

As shown in FIGS. 3–5, the locking tab 22 is preferably formed from a flexible plastic material, such as an acetal, available from Hoechst Celanese Corporation, Dallas, Tex., under the trade name CELCON™, and has a generally rectangular body 24 with one end 26 extending past an edge of the chassis 12 and an opposing end 25 engaging the DIN rail bottom flange 18. A slot 28 formed in the end 26 is adapted for receiving a screw driver tip for prying the locking tab 22 downwardly to release the chassis 12 from the DIN rail 14. A beveled edge 30, more clearly shown in FIG. 2, on the locking tab upper end 25 facilitates the downwardly movement of the tab 22 when pressure is applied to the chassis 12 for mounting to the DIN rail 18. Inwardly depending lips 32 integrally formed as part of the chassis 12 engages flanges 34 formed an integral part of the body 24 mounting the locking tab 22 on the chassis 12 for slidable movement. The lips 32 do not extend to the edge of the chassis 12, thus preventing the locking tab 22 from sliding past the chassis edge free of the lips 32.

A nub 36 formed as an integral part of the chassis 12 extends into a generally rectangular opening 38 formed in the locking tab body 24. A pair of opposing cantilever springs 40, each having a proximal end 42 and a distal end 44 are formed as an integral part of the body 24 at the spring proximal ends 42 and extend into the opening 38. The springs 40 engage the nub 36, such that slidable movement of the locking tab 22 flex the springs 40 outwardly as they slide past the nub 36. Although arcuate springs are preferred, other shaped springs, such as the straight inwardly extending springs as shown in Japanese Application No. 1-75815, may also be used without departing from the scope of the present invention.

Outwardly extending extensions 46 formed as an integral part of each spring distal end 44 define an inflection point 48 in each spring 40. The inflection point 48 defines the snap point for changing from a first mode, shown in FIG. 3, to a second mode, shown in FIG. 5. At the inflection point 48, each spring distal end extension 46 extends outwardly cooperatively forming a cradle for the nub 36. As shown in FIG. 5, when the locking tab 22 is pulled downwardly, such that the inflection point 48 is pulled past the nub 36, the nub 36 is received in the cradle and the springs 40 do not urge the locking tab 22 upwardly. Advantageously, the cradle maintains the locking tab 22 in the open position.

In order to move the locking tab 22 from the closed position to the open position, the user pulls the tab 22 downwardly, such that the inflection points 48 in the arcuate springs 40 are pulled past the nub 36 snapping the tab 22 into the open position. To return the tab 22 back to the closed position, the user merely slides the tab 22 upwardly forcing the inflection points 48 past the nub 36, such that the springs 40 engage the nub 36 urging the tab 22 upwardly.

As shown in FIG. 3, a stop 52 formed as an integral part of the body 24 disposed between the springs 40 in the opening 38 abuts the nub 36 in the locking tab closed position. The stop 52 prevents the locking tab 22 from sliding too far toward the rail 14.

As shown in FIG. 4, the novelty of the present invention resides in the extensions 46 which impinge upon the walls 50 of the opening 38 as spring inflection points 48 approach the nub 36. The impinging action on the opening walls 50 non-linearly increases the force required to pull the locking tab 22 downwardly as the inflection points 48 approach the nub 36, thus providing tactile feedback of the approaching nub 36 and impending mode change.

The present invention can be characterized as a cam, such as the nub 36, mounted to the chassis 12, a cam follower, such as the arcuate springs 40, mounted to the locking tab 22, and a spring biased element, such as the extensions 46, mounted to the cam follower, such that slidable movement of the locking tab 22 past the cam causes translational movement of the cam follower, which in turn, causes the spring biased elements to impinge upon a surface, such as the opening wall 50, with increasing force until the cam snaps over to reengage the cam follower in the opposite direction.

A second embodiment of the present invention, as shown in FIG. 6, is a chassis 12' having a pair of opposing locking tabs 22', each locking tab 22' is slidably mounted for engagement of an opposing DIN rail flange as described for the locking tab 22 in the first embodiment described herein. Each tab is similarly configured as the locking tab 22 of the first embodiment having cantilever springs 40' with extensions 46', deflection points 48', and a stop 52' for engaging a nub 36'. Each nub 36' is formed as an integral part of the chassis 12'. This particular embodiment is especially useful for interlocking chassis, such as "tongue and groove" module chassis where the present invention allows easier replacement of a single chassis interlocked with one or more other interlocking chassis.

While there has been shown and described what are at present considered the preferred embodiment of the invention, it will be obvious to those skilled in the art that various changes and modifications can be made therein without departing from the scope of the invention defined by the appended claims. For example, one variation to the present invention includes forming or mounting one or more cantilever springs on a chassis and providing a nub on a slidably movable locking tab. Another variation includes providing dual outside cams or nubs which cause translational movement of the cam follower, or springs, inward against a central body, or surface, which is a part of the locking tab or chassis.

I claim:

1. A dual mode latch for mounting a chassis to a DIN rail, said latch being spring biased into engagement with the DIN rail only in a first mode and not in a second mode, said DIN rail being characterized by an elongate channel having opposed parallel outwardly extending flanges along sides thereof, said latch comprising:

a locking tab mounted to said chassis to slidably engage a flange of the DIN rail in a first direction and to slidably disengage the DIN rail in a second direction, when the chassis is placed against the DIN rail;

a cam mounted on said chassis;

a cam follower mounted on said locking tab to engage said cam with sliding of said locking tab;

a spring element communicating with said cam follower to urge said cam follower against said cam;

wherein slidable movement of said locking tab past said cam induces translational movement of said cam follower impinging said spring biased element against a surface, whereby said impinging action provides tactile feedback to a user of an impending latch mode change.

2. A latch as in claim 1 wherein said cam is formed a part of said chassis extending perpendicular to said sliding direction.

3. A latch as in claim 1, wherein said cam follower and spring element is a pair of arcuate fingers formed a part of said locking tab.

4. A latch as in claim 1, wherein said surface is a surface on said locking tab.

5. A latch as in claim 1, wherein said tactile feedback is an increasing resistive force as said locking tab is moved in said second direction.

6. A method of providing tactile feedback of an impending mode change in a dual mode latch, said method comprising the steps of:

sliding a locking tab past a cam;

engaging said cam with a cam follower mounted on said locking tab;

impinging a spring biased extension mounted to said cam follower against a surface as said cam approaches a mode change point; and retracting said extension after said mode change.

7. A chassis having a dual mode latch for mounting said chassis to a rail having opposing flanges, said chassis comprising:

a lip affixed to said chassis for engaging one of said rail flanges;

a locking tab mounted for slidable movement to said chassis, said locking tab slidably mounted for engagement of the other rail flange, said locking tab having an opening formed therein;

a nub affixed to said chassis and extending into said opening;

a spring being formed as an integral part of said locking tab and extending into said opening engaging said nub, wherein engagement of said nub urges said locking tab toward said rail;

an extension formed part of said spring, wherein slidable movement of said locking tab causes said extension to impinge on a surface as said latch approaches a mode change.

8. A chassis as in claim 7, wherein said lip is integrally formed as part of said chassis.

9. A chassis as in claim 7, wherein said nub is integrally formed as part of said chassis.

10. A chassis as in claim 7, wherein said extension is formed part of a distal end of said spring.

11. A chassis as in claim 7, wherein said surface is a wall of said opening.

12. A chassis as in claim 7, wherein said lip is a second locking tab slidably mounted for engaging said one of said rail flanges.

* * * * *